United States Patent [19]

Kang

[11] Patent Number: 5,099,365
[45] Date of Patent: Mar. 24, 1992

[54] CIRCUIT FOR SIMULTANEOUSLY GENERATING THE SOUNDS OF BOTH MAIN PICTURE AND SUB-PICTURE FOR A PICTURE-IN-PICTURE SYSTEM OF VTR

[75] Inventor: Ku-Ho Kang, Suwon, Rep. of Korea

[73] Assignee: SamSung Electronics Co., Ltd., Suwon, Rep. of Korea

[21] Appl. No.: 390,890

[22] Filed: Aug. 8, 1989

[30] Foreign Application Priority Data

Aug. 8, 1988 [KR] Rep. of Korea ............... 1988-13053

[51] Int. Cl.$^5$ ............................................. G11B 15/12
[52] U.S. Cl. ........................................ 360/61; 358/183
[58] Field of Search ................... 360/61, 33.11, 67; 358/142, 143, 183, 198

[56] References Cited

U.S. PATENT DOCUMENTS

| | | | |
|---|---|---|---|
| 2,832,821 | 4/1958 | DuMont | 358/142 |
| 4,486,897 | 12/1984 | Nagai | 358/198 |
| 4,890,168 | 12/1989 | Inoue et al. | 358/183 |

Primary Examiner—David J. Severin
Attorney, Agent, or Firm—Robert E. Bushnell

[57] ABSTRACT

There is disclosed a circuit for simultaneously generating the sounds of both main picture and sub-picture for a PIP system by separately driving the main picture mode and the sub-picture mode. The invention to achieve the object has a first switching stage for selecting a given voltage, hi-fi sound stage for amplifying and demodulating the hi-fi regenerating signal, second switching stage for selecting a given voltage, linear sound receiving stage for receiving linear regenerating signals, third switching stage for selecting the output signal of the hi-fi sound receiving stage, adder for adding the output signal of the hi-fi sound receiving stage, first jack amplifier for amplifying the signal from the third switching stage to produce an output to headphone jack terminal, and second jack amplifier for amplifying the signal from the third switching stage to produce the output to headphone jack terminal.

1 Claim, 1 Drawing Sheet

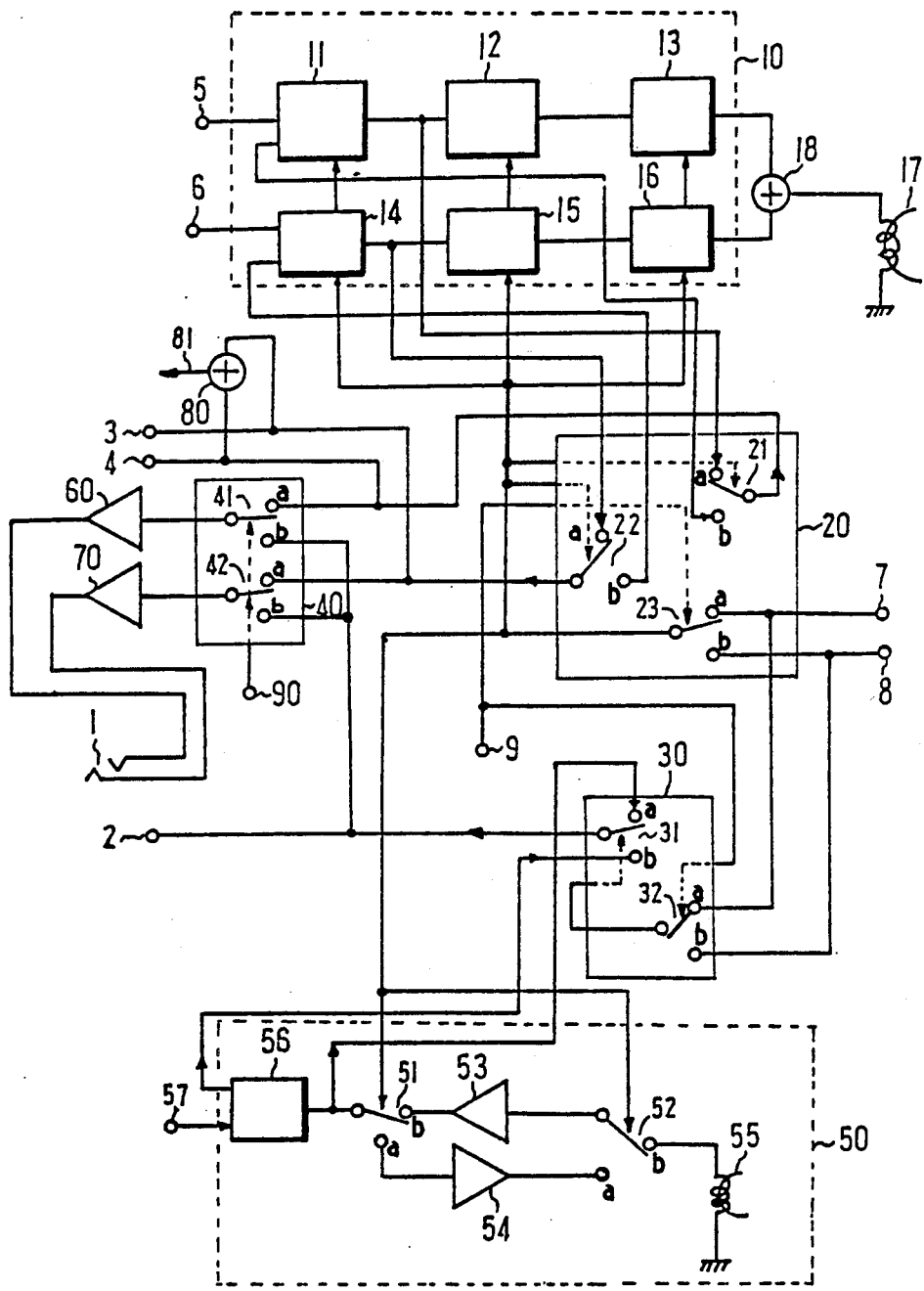
F I G. 1

CIRCUIT FOR SIMULTANEOUSLY GENERATING THE SOUNDS OF BOTH MAIN PICTURE AND SUB-PICTURE FOR A PICTURE-IN-PICTURE SYSTEM OF VTR

BACKGROUND OF THE INVENTION

The present invention concerns a circuit for simultaneously generating the sounds of both main picture and sub-picture for a picture-in-picture (PIP) system of a VTR.

In a conventional hi-fi VTR having the picture-in-picture system, when the sub-picture is viewed together with the main picture, it is impossible to simultaneously generate the sounds of both the main picture and the sub-picture through a TV monitor, because the circuit for driving the main picture and the circuit for driving the sub-picture are all driven in the same mode.

SUMMARY OF THE INVENTION

An object of the present invention is to provide a circuit for simultaneously generating the sounds of both the main picture and the sub-picture for a PIP system by separately driving the main picture mode and the sub-picture mode.

According to the present invention, a circuit for simultaneously generating the sounds of both the main picture and the sub-picture comprises first switching means for selecting a given voltage through power source terminal or delay regenerating signal through delay regenerating signal input terminal according to the selecting signal inputted through main picture/sub-picture selecting signal input terminal, hi-fi sound receiving means for amplifying and demodulating the hi-fi regenerating signal inputted through hi-fi head and adder by taking regenerating mode when the selected signal of said first switching means indicates said delay regenerating signal or for eliminating noises from EE signal inputted through line input terminals by taking EE mode when the selected signal of said switching means indicates said given voltage, second switching means for selecting said given voltage through said power source input terminal or said delay regenerating signal through said delay regenerating signal input terminal according to the selecting signal inputted through said main picture/sub-picture selecting signal input terminal, linear sound receiving means for receiving linear regenerating signal through linear head or EE signal through line input terminal according to the switching of said first switching means, third switching means for selecting the output signal of said hi-fi sound receiving means through said first switching means or the output signal of said linear sound receiving means through said second switching means according to the selecting signal inputted through main sound/sub-sound selecting signal input terminal, adder for adding the output signal of said hi-fi sound receiving means through said first switching means to produce the output through output terminal to radio frequency converter, first jack amplifier for amplifying the signal inputted through said third switching means to produce the output to headphone jack terminal, and second jack amplifier for amplifying the signal inputted through said third switching means to produce the output to headphone jack terminal.

The present invention will now be describe more specifically with reference to the drawing attached only by way of example.

BRIEF DESCRIPTION OF THE DRAWING

FIG. 1 illustrates the inventive circuit.

DESCRIPTION OF THE PREFERRED EMBODIMENT

First switching means 20 comprising switches 21, 22, 23 is to select a given voltage through power source terminal 7 or delay regenerating signal through delay regenerating signal input terminal 8 according to the selecting signal inputted through main picture/sub-picture selecting signal input terminal 9.

Hi-fi sound receiving means 10 comprises noise eliminators 11 and 14, modems 12 and 15, and recording and free amplifiers 13 and 16. The hi-fi sound receiving means 10 amplifies and demodulates the hi-fi regenerating signal inputted through hi-fi head 17 and adder 18 by taking regenerating mode when the selected signal of the first switching means 20 indicates the delay regenerating signal or eliminates noises from EE signal inputted through line input terminals 5 and 6 by taking EE mode when the selected signal of the switching means indicates the given voltage.

Second switching means 30 comprising switches 31 and 32 selects the given voltage through the power source input terminal 7 or the delay regenerating signal through the delay regenerating signal input terminal 8 according to the selecting signal inputted through the main picture/sub-picture selecting signal input terminal 9.

Linear sound receiving means 50, comprising switches 51 and 52, free amplifier 53, recording amplifier 54, and line amplifier 56, receives linear regenerating signal through linear head 55 or EE signal through line input terminal 57 according to the switching of the first switching means 20.

Third switching means 40 comprising switches 41 and 42 selects the output signal of the hi-fi sound receiving means 10 through the first switching means 20 or the output signal of the linear sound receiving means 50 through the second switching means 30 according to the selecting signal inputted through main sound/sub-sound selecting signal input terminal 90.

Adder 80 adds the output signal of the hi-fi sound receiving means 10 through the first switching means 20 to produce the output through output terminal 81 to radio frequency converter.

First jack amplifier 60 amplifies the signal inputted through the third switching means 40 to produce the output to headphone jack terminal 1. Second jack amplifier 70 amplifies the signal inputted through the third switching means 40 to produce the output to headphone jack terminal 1.

In operation, if the main picture selecting signal, i.e., high signal, is inputted through the main picture/sub-picture selecting signal input terminal 9, the switch 23 makes a connection with terminal b. Then, the delay regenerating signal from the delay regenerating signal input terminal 8, i.e., low signal is inputted through the switch 23 into the noise eliminators 11 and 14, modems 12 and 15, and recording and free amplifiers 13 and 16, thereby placing them in the regenerating mode. Thus, the hi-fi regenerated signal produced from the hi-fi head 17 is demodulated through the adder 18, the recording and free amplifier 13 and the modem 12 into the original form that is inputted into terminal a of the switch 21, and through the adder 18, recording and free amplifier 16 and the modem 15 into the original form that is inputted into terminal a of the switch 22.

As the delay regenerating signal is inputted into the switches 21 and 22, which make a connection respectively with the terminals a, the hi-fi regenerating signal is outputted through the switches 21 and 22 to line output terminals 3 and 4 and also inputted into the adder 80. Besides, the hi-fi regenerating signal is inputted through the switches 21 and 22 into terminals a of the switches 41 and 42. The hi-fi regenerating signals through the switches 21 and 22 are mixed by the adder 80, outputted through the output terminal 81 to the RF converter, so that the user can listen to the sound of the main picture through a TV monitor (not shown).

On the other hand, the main picture selecting signal inputted through the main picture/sub-picture selecting signal input terminal 9 causes the switch 32 to make a connection with the terminal a, so that the given voltage through the power source input terminal 7 is inputted through the switch 32 into the switch 31. In this case, the switch 31 makes a connection with the terminal a by the given voltage the EE (Electronic and Electronic) signal through the line input terminal 57 is amplified by the line amplifier 56, and then, delivered to the line output terminal 2 through the switch 31 and to the terminals b of the switches 41 and 42. If through the main sound/sub-sound selecting signal input terminal 90 is inputted the sub-sound selecting signal, the switches 41 and 42 make connections with the terminals b, so that the linear regenerating signal is inputted into the headphone jack 1 through the switches 41 and 42 and the amplifiers 60 and 70. Hence, the sound of the main picture is generated through the line output terminals 3 and 4 and a converter, while the sound of the sub-picture is generated through the headphone jack 1.

Meanwhile, if through the main picture/sub-picture selecting signal input terminal 9 is inputted the sub-picture selecting signal, i.e., low signal, the switch 23 makes a connection with the terminal a, so that the given voltage through the power source input terminal 7 and the switch 23 causes the switches 21 and 22 to make a connection respectively with the terminals b. In addition, the given voltage through the power source input terminal 7 causes the noise eliminators, the modems 12 and 15, and the recording and free amplifiers 13 and 16 to be placed in the EE mode. Consequently, the EE signal through the line input terminal 5 is inputted through the noise eliminator 11 to the terminal b of the switch 21, while the EE signal through the line input terminal 6 is inputted through the noise eliminator 14 into the terminal b of the switch 22. Thus, the EE signals through the switches 21 and 22 are delivered to a given system through the hi-fi line output terminals 3 and 4, and to the adder 80.

Since the switch 32 makes a connection with the terminal b according to the sub-picture selecting signal, the power source through the power source input terminal 7 and the switch 30 causes the switch 31 to make a connection with the terminal a. Moreover, the given voltage through the power source input terminal 7 causes the switches 51 and 52 to make a connection respectively with the terminals b, and therefore, the signal regenerated by the linear head 55 is inputted into the terminal a of the switch 31 through the switch 52, the free amplifier 53 and the switch 51. Thus, the linear regenerated signal through the switch 31 is inputted into the line output terminal 2 as well as into the terminals b of the switches 41 and 42. In this case, if through the main sound/sub-sound selecting signal input the sub-sound selecting signal, the switches 41 and 42 make a connection respectively with the terminals b, so that the linear regenerated signal is inputted into the jack 1 through the amplifiers 60 and 70. Thus, the sound of the EE picture can be generated through the hi-fi line output terminals 3 and 4 and the RF converter, while the sound of the regenerated picture can be generated through the jack 1.

As described above, the present invention provides a circuit for simultaneously generating the sounds of both the main picture and the sub-picture for a PIP system of a VTR by separately driving the main picture mode and the sub-picture mode.

Therefore, according to the present invention, while one listens to the sound of the main picture through the TV monitor, while another listens to the sound of sub-picture through the headphone.

What is claimed is:

1. In a VTR having a picture-in-picture system, a circuit for simultaneously generating the sounds of both main picture and sub-picture comprising:

first switching means for selecting a given voltage through a power source terminal or delay regenerating signal through a delay regenerating signal input terminal according to a selecting signal from a main picture/sub-picture selecting signal input terminal;

hi-fi sound receiving means for amplifying and demodulating the hi-fi regenerating signal when the selected signal of said first switching means indicates said delay regenerating signal or for eliminating noises of an EE (Electronic and Electronic) signal from an EE input terminal when the selected signal of said first switching means indicates said given voltage;

second switching means for selecting said given voltage through said power source terminal or said delay regenerating signal through said delay regenerating signal input terminal according to said selecting signal;

linear sound receiving means for receiving a linear regenerating signal or an EE signal through a line input terminal according to the selection performed by said first switching means;

third switching means for selecting the output signal of said hi-fi sound receiving means through said first switching means or the output signal of said linear sound receiving means through said second switching means according to the selecting signal from a main sound/sub-sound selecting signal input terminal;

adder means for adding the output signal of said hi-fi sound receiving means through said first switching means to product an output; and amplify means for amplifying the signal input through said third switching means to produce a second output.

* * * * *

UNITED STATES PATENT AND TRADEMARK OFFICE
CERTIFICATE OF CORRECTION

PATENT NO. : 5,099,365

DATED : March 24, 1992

INVENTOR(S) : Ku-Ho Kang

Page 1 of 4

It is certified that error appears in the above-identified patent and that said Letters Patent is hereby corrected as shown below:

Delete the title page and columns 1-4, and substitute therefor the attached pages.

Signed and Sealed this

Nineteenth Day of January, 1993

*Attest:*

DOUGLAS B. COMER

*Attesting Officer*    *Acting Commissioner of Patents and Trademarks*

United States Patent [19]

Kang

[11] Patent Number: 5,099,365
[45] Date of Patent: Mar. 24, 1992

[54] CIRCUIT FOR SIMULTANEOUSLY GENERATING THE SOUNDS OF BOTH MAIN PICTURE AND SUB-PICTURE FOR A PICTURE-IN-PICTURE SYSTEM OF VTR

[75] Inventor: Ku-Ho Kang, Suwon, Rep. of Korea
[73] Assignee: SamSung Electronics Co., Ltd., Suwon, Rep. of Korea
[21] Appl. No.: 390,890
[22] Filed: Aug. 8, 1989

[30] Foreign Application Priority Data

Aug. 8, 1988 [KR] Rep. of Korea ............... 1988-13053

[51] Int. Cl.[5] ........................................... G11B 15/12
[52] U.S. Cl. ........................................ 360/61; 358/183
[58] Field of Search ................ 360/61, 33.11, 67; 358/142, 143, 183, 198

[56] References Cited

U.S. PATENT DOCUMENTS

| | | | |
|---|---|---|---|
| 2,832,821 | 4/1958 | DuMont | 358/142 |
| 4,486,897 | 12/1984 | Nagai | 358/198 |
| 4,890,168 | 12/1989 | Inoue et al. | 358/183 |

Primary Examiner—David J. Severin
Attorney, Agent, or Firm—Robert E. Bushnell

[57] ABSTRACT

There is disclosed a circuit for simultaneously generating the sounds of both main picture and sub-picture for a PIP system by separately driving the main picture mode and the sub-picture mode. The invention to achieve the object has a first switching stage for selecting a given voltage, hi-fi sound stage for amplifying and demodulating the hi-fi regenerating signal, second switching stage for selecting a given voltage, linear sound receiving stage for receiving linear regenerating signals, third switching stage for selecting the output signal of the hi-fi sound receiving stage, adder for adding the output signal of the hi-fi sound receiving stage, first jack amplifier for amplifying the signal from the third switching stage to produce an output to headphone jack terminal, and second jack amplifier for amplifying the signal from the third switching stage to produce the output to headphone jack terminal.

1 Claim, 1 Drawing Sheet

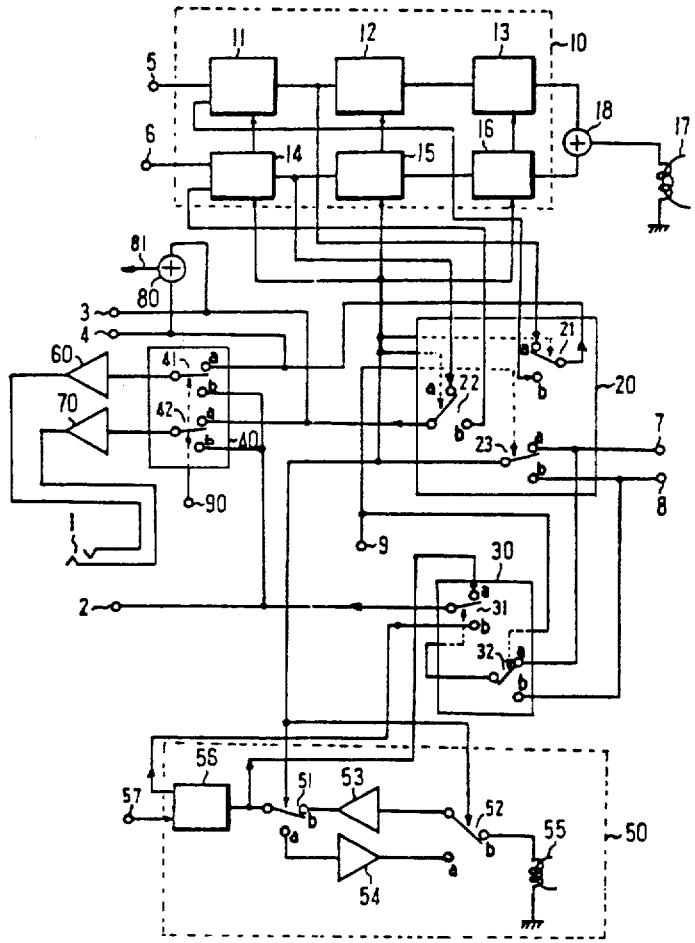

CIRCUIT FOR SIMULTANEOUSLY GENERATING THE SOUNDS OF BOTH MAIN PICTURE AND SUB-PICTURE FOR A PICTURE-IN-PICTURE SYSTEM OF VTR

BACKGROUND OF THE INVENTION

The present invention concerns a circuit for simultaneously generating the sounds of both main picture and sub-picture for a picture-in-picture (PIP) system of a VTR.

In a conventional hi-fi VTR having the picture-in-picture system, when the sub-picture is viewed together with the main picture, it is impossible to simultaneously generate the sounds of both the main picture and the sub-picture through a TV monitor, because the circuit for driving the main picture and the circuit for driving the sub-picture are all driven in the same mode.

SUMMARY OF THE INVENTION

An object of the present invention is to provide a circuit for simultaneously generating the sounds of both the main picture and the sub-picture for a PIP system by separately driving the main picture mode and the sub-picture mode.

According to the present invention, a circuit for simultaneously generating the sounds of both the main picture and the sub-picture comprises first switching means for selecting a given voltage through a power source terminal or a delay regenerating signal through a delay regenerating signal input terminal according to the selecting signal inputted through the main picture/sub-picture selecting signal input terminal, hi-fi sound receiving means for amplifying and demodulating the hi-fi regenerating signal input through a hi-fi head and adder in the regenerating mode when the selected signal of the first switching means indicates the delay regenerating signal or for eliminating noises from the EE signal input through line input terminals in the EE mode when the selected signal of the switching means indicates the given voltage, second switching means for selecting the given voltage through the power source input terminal or the delay regenerating signal through the delay regenerating signal input terminal according to the selecting signal input through the main picture/sub-picture selecting signal input terminal, linear sound receiving means for receiving a linear regenerating signal through a linear head or an EE signal through a line input terminal according to the switching of the first switching means, third switching means for selecting the output signal of the hi-fi sound receiving means through the first switching means or the output signal of the linear sound receiving means through the second switching means according to the selecting signal input through a main sound/sub-sound selecting signal input terminal, an adder for adding the output signal of the hi-fi sound receiving means through the first switching means to produce the output through an output terminal to radio frequency converter, a first jack amplifier for amplifying the signal input through the third switching means to produce the output to a headphone jack terminal, and a second jack amplifier for amplifying the signal input through the third switching means to produce the output to a headphone jack terminal.

The present invention will now be described more specifically with reference to the drawing attached only by way of example.

BRIEF DESCRIPTION OF THE DRAWING

FIG. 1 illustrates the inventive circuit.

DETAIL DESCRIPTION OF THE INVENTION

First switching means 20 comprising switches 21, 22, 23 selects a given voltage through power source terminal 7 or a delay regenerating signal through delay regenerating signal input terminal 8 according to the selecting signal input through main picture/sub-picture selecting signal input terminal 9.

Hi-fi sound receiver 10 comprises noise eliminators 11 and 14, modems 12 and 15, and recording and free amplifiers 13 and 16. The hi-fi sound receiver 10 amplifies and demodulates the hi-fi regenerating signal input through hi-fi head 17 and adder 18 in the regenerating mode when the selected signal of the first switching stage 20 indicates the delay regenerating signal or eliminates noises from the EE signal input through line input terminals 5 and 6 in the EE mode when the selected signal of the switching stage indicates the given voltage.

Second switching stage 30, comprising switches 31 and 32, selects the given voltage through power source input terminal 7 or the delay regenerating signal through delay regenerating signal input terminal 8 according to the selecting signal input through main picture/sub-picture selecting signal input terminal 9.

Linear sound receiver 50, comprising switches 51 and 52, free amplifier 53, recording amplifier 54, and line amplifier 56, receives the linear regenerating signal through linear head 55 or the EE signal through line input terminal 57 according to the switching of first switching stage 20.

Third switching stage 40, comprising switches 41 and 42, selects the output signal of hi-fi sound receiving means 10 through first switching means 20 or the output signal of linear sound receiving means 50 through second switching stage 30 according to the selecting signal inputted through main sound/sub-sound selecting signal input terminal 90.

Adder 80 adds the output signal of hi-fi sound receiving means 10 through first switching stage 20 to produce the output through output terminal 81 to a radio frequency converter.

First jack amplifier 60 amplifies the signal inputted through third switching stage 40 to produce the output to headphone jack terminal 1. Second jack amplifier 70 amplifies the signal input through third switching stage 40 to produce the output to headphone jack terminal 1.

In operation, if the main picture selecting signal (i.e., high signal) is input through main picture/sub-picture selecting signal input terminal 9, switch 23 makes a connection with terminal b. Then, the delay regenerating signal from delay regenerating signal input terminal 8, (i.e., low signal) is input through switch 23 into the noise eliminators 11 and 14, modems 12 and 15, and recording and free amplifiers 13 and 16, thereby placing them in the regenerating mode. Thus, the hi-fi regenerated signal produced from hi-fi head 17 is demodulated through adder 18, recording and free amplifier 13 and modem 12 into the original form that is input into terminal a of switch 21, and through adder 18, recording and free amplifier 16 and modem 15 into the original form that is input into terminal a of switch 22.

As the delay regenerating signal is input into switches 21 and 22, which make a connection respectively with terminal a, the hi-fi regenerating signal is output through switches 21 and 22 to line output terminals 3 and 4 and is also input into adder 80. Besides, the hi-fi regenerating signal is input through switches 21 and 22 into terminal a of switches 41 and 42. The hi-fi regenerating signals through switches 21 and 22 are mixed by adder 80, and output through output terminal 81 to the RF converter, so that the user can listen to the sound of the main picture through a TV monitor (not shown).

On the other hand, the main picture selecting signal input through main picture/sub-picture selecting signal input terminal 9 causes switch 32 to make a connection with terminal a, so that the given voltage through power source input terminal 7 is input through switch 32 into switch 31. In this case, switch 31 makes a connection with terminal a by the given voltage the EE (Electronic and Electronic) signal through the line input terminal 57 and is amplified by line amplifier 56, and then, is delivered to line output terminal 2 through switch 31 and to the terminals b of switches 41 and 42. If through the main sound/sub-sound selecting signal input terminal 90 is input the sub-sound selecting signal, switches 41 and 42 make connections with the terminals b, so that the linear regenerating signal is input into headphone jack 1 through switches 41 and 42 and amplifiers 60 and 70. Hence, the sound of the main picture is generated through line output terminals 3 and 4 and a converter, while the sound of the sub-picture is generated through headphone jack 1.

Meanwhile, if through the main picture/sub-picture selecting signal input terminal 9 is input the sub-picture selecting signal, (i.e., low signal) switch 23 makes a connection with terminal a, so that the given voltage through power source input terminal 7 and switch 23 causes switches 21 and 22 to make a connection respectively with the terminals b. In addition, the given voltage through power source input terminal 7 causes the noise eliminators, modems 12 and 15, and recording and free amplifiers 13 and 16 to be placed in the EE mode. Consequently, the EE signal through line input terminal 5 is input through noise eliminator 11 to terminal b of switch 21, while the EE signal through line input terminal 6 is input through noise eliminator 14 into terminal b of switch 22. Thus, the EE signals through switches 21 and 22 are delivered to a given system through the hi-fi line output terminals 3 and 4, and to adder 80.

Since switch 32 makes a connection with terminal b according to the sub-picture selecting signal, the power source through power source input terminal 7 and switch 30 causes switch 31 to make a connection with terminal a. Moreover, the given voltage through power source input terminal 7 causes switches 51 and 52 to make a connection respectively with the terminals b, and therefore, the signal regenerated by linear head 55 is input into terminal a of switch 31 through switch 52, free amplifier 53 and switch 51. Thus, the linear regenerated signal through switch 31 is input into line output terminal 2 as well as into the terminals b of switches 41 and 42. In this case, if the main sound/sub-sound selecting signal and the sub-sound selecting signal are input, switches 41 and 42 make a connection respectively with the terminals b, so that the linear regenerated signal is input into jack 1 through amplifiers 60 and 70. Thus, the sound of the EE picture can be generated through hi-fi line output terminals 3 and 4 and the RF converter, while the sound of the regenerated picture can be generated through jack 1.

As described above, the present invention provides a circuit for simultaneously generating the sounds of both the main picture and the sub-picture for a PIP system of a VTR by separately driving the main picture mode and the sub-picture mode.

Therefore, according to the present invention, one is enabled to listens to the sound of the main picture through the TV monitor, while another listens to the sound of sub-picture through the headphone.

What is claimed is:

1. In a VTR having a picture-in-picture system, a circuit for simultaneously generating the sounds of both main picture and sub-picture comprising:

first switching means for selecting a given voltage through a power source terminal or delay regenerating signal through a delay regenerating signal input terminal according to a selecting signal from a main picture/sub-picture selecting signal input terminal;

hi-fi sound receiving means for amplifying and demodulating the hi-fi regenerating signal when the selected signal of said first switching means indicates said delay regenerating signal or for eliminating noises of an EE (Electronic and Electronic) signal from an EE input terminal when the selected signal of said first switching means indicates said given voltage;

second switching means for selecting said given voltage through said power source terminal or said delay regenerating signal through said delay regenerating signal input terminal according to said selecting signal;

linear sound receiving means for receiving a linear regenerating signal or an EE signal through a line input terminal according to the selection performed by said first switching means;

third switching means for selecting the output signal of said hi-fi sound receiving means through said first switching means or the output signal of said linear sound receiving means through said second switching means according to the selecting signal from a main sound/sub-sound selecting signal input terminal;

adder means for adding the output signal of said hi-fi sound receiving means through said first switching means to product an output; and amplify means for amplifying the signal input through said third switching means to produce a second output.

* * * * *

UNITED STATES PATENT AND TRADEMARK OFFICE
CERTIFICATE OF CORRECTION

PATENT NO. : 5,099,365
DATED : March 24, 1992
INVENTOR(S) : Ku-Ho Kang It is certified that error appears in the above-identified patent and that said Letters Patent is hereby corrected as shown below:

Column 4, Line 14, change "listens" to --listen--;

Claim 1, Column 4, Line 54, change "product" to --produce--.

Signed and Sealed this

Ninth Day of November, 1993

Attest:

BRUCE LEHMAN

Attesting Officer        Commissioner of Patents and Trademarks